Patented Nov. 3, 1942

2,300,453

UNITED STATES PATENT OFFICE

2,300,453
ANTHRAPYRIDONE DYESTUFFS

Frank Lodge, Blackley, Manchester, England, assignor to Imperial Chemical Industries Limited, a corporation of Great Britain No Drawing. Application January 25, 1940, Serial No. 315,617. In Great Britain February 15, 1939

7 Claims. (Cl. 260—278)

This invention relates to new acid dyestuffs.

The dyestuffs consist of, or contain as their colouring ingredients, sulphonic acids (including insoluble salts of sulphonic acids) of 6-arylamino-3-arylanthrapyridones.

Aryl means phenyl, which may carry alkyl or cycloalkyl substituents, diphenyl or naphthyl, which may be hydrogenated radicals and acid dyestuff substituents, for instance, chloro, hydroxy, methoxy and phenoxy substituents, may be present in the dyestuff molecule.

According to the invention we make the dyestuffs by monoacetylating the corresponding 1:4-diarylaminoanthraquinones, ring-closing the acetylated derivatives to 6-arylamino-3-arylanthrapyridones and sulphonating.

Also according to the invention we use the new dyestuffs in colouring wool and silk and other animal fibres.

The dyestuffs dye in bright red to violet shades, and the shades are fast to light.

It is known from specification No. 28,765/1906 to make anthrapyridonesulphonic acids and use them as dyestuffs for animal fibres, but that specification does not describe 6-arylamino-3-arylanthrapyridone derivatives.

The invention may be illustrated by reference to the preparation of a dyestuff from 1:4-di-p-toluoidinoanthraquinone. This compound is monoacetylated, ring-closed and disulphonated to give 6-p-toluidino-3-p-tolylanthrapyridone-disulphonic acid. It dyes wool in bright bluish-red shades of good fastness to light and perspiration. The shades are almost the same as those given by the corresponding known dyestuff which carries a methyl substituent in position 3 instead of a sulphotolyl one, but the fastness to perspiration is greater than with the latter dyestuff (Colour Index No. 1091, specification No. 28,765/1906). The new dyestuff has fewer preparation stages than the old, since the new is made in 4 stages from quinizarin, whilst the old is made in 6 stages from anthraquinone-1-sulphonic acid.

The corresponding dyestuff made in a similar way from 1:4-di-p-butylanilinoanthraquinone has similar properties, but higher fastness to washing treatments.

In carrying the invention into practical effect, 1:4-diarylaminoanthraquinones may be used in which the two aryl radicals are the same or different. It is however convenient to use those in which they are the same, since such starting materials are so readily obtained from leuco-quinizarin and the corresponding arylamines.

The monoacetylation is readily effected by treating the diarylaminoanthraquinone with the acylating agent under mild conditions. For instance monoacetylation is readily effected by heating with acetic anhydride and a little concentrated sulphuric acid in acetic acid, or nitrobenzene. The ring-closure may be effected by a heat treatment under alkaline conditions. Sulphonation may be effected by treatment with a sulphonating agent, e. g. 5–10% oleum. Generally speaking two sulphonic acid groups are found most satisfactory.

The following examples in which parts are by weight illustrate but do not limit the invention.

Example 1

39 parts of 1:4-dianilinoanthraquinone, 175 parts of nitrobenzene, 25 parts of acetic anhydride and 1.2 parts of 100% sulphuric acid are heated at 100° C. for 1 hour. The nitrobenzene is removed in steam, the residue filtered, washed with water and dried.

The dry product, which is the acetyl derivative, is dissolved in 300 parts of β-ethoxyethyl alcohol and 60 parts of 32% aqueous sodium hydroxide solution added. The mixture is stirred at 100° C. for 1 hour, cooled and the product filtered, washed successively with ethyl alcohol and water and dried. The dry product is in the form of dark red crystals. It may be purified, if desired, by recrystallisation from butyl alcohol.

For sulphonation, 30 parts of the above anthrapyridone compound are dissolved in 300 parts of 100% sulphuric acid and then 50 parts of 20% oleum are added at 20–25° C. The mixture is stirred for half an hour, poured on to ice-water and filtered. The filter cake is neutralised with sodium hydroxide in 2000 parts of water at 80° C. 150 parts of sodium chloride are added and the mixture cooled and filtered. The product is dried at 60–80° C.

The dry product dissolves in water with a bright bluish-red colour. It dyes wool from a slightly acid bath in bluish-red shades of good fastness properties.

1-anilino-4-p-toluidino-anthraquinone may be used instead of 1:4-dianilino-anthraquinone in the above process and a similar dyestuff obtained.

Example 2

100 parts of 1:4-di-p-butylanilino-anthroquinone, 350 parts of nitrobenzene, 50 parts of acetic anhydride and 1.2 parts of 100% sulphuric acid are stirred at 100° C. for 1 hour. The acetyl compound is isolated as in Example 1.

For pyridonation, the acetyl compound is heated at 100° C. for half an hour in a mixture of 600 parts of β-ethoxyethyl alcohol and 120 parts of 32% aqueous sodium hydroxide solution, cooled to 40° C., 500 parts of ethyl alcohol added and filtered. The filter cake is washed with ethyl alcohol, then water, and dried at 50° C.

The new compound, 6-p-butylanilino-3-p-butylphenyl-1:9-anthrapyridone crystallises readily from ethyl alcohol. It is sulphonated by dissolving 1 part in 10 parts of 8% oleum and stirring the mixture at 30–35° C. for half an hour. The dyestuff is isolated in a similar manner to that of Example 1. The resulting dyestuff dissolves readily in water with a bright bluish-red colour and the solution froths on shaking. It dyes wool in bright bluish-red shades of very good fastness to washing, milling, perspiration and light.

*Example 3*

100 parts of 1:4-di-p-butylanilino-anthraquinone, 100 parts of glacial acetic acid, 50 parts of acetic anhydride and 0.75 part of 100% sulphuric acid are stirred at 98–100° C. for 15 minutes. The deep-red solution is cooled to 20° C. and diluted with 600 parts of β-ethoxyethyl alcohol and 100 parts of water. 150 parts of sodium hydroxide powder are added at 20–50° C. with good stirring and the mixture heated at 98–100° C. for 1 hour. After cooling to 20° C. the product is filtered, washed with ethyl alcohol and with water and dried. It is purified by heating with 800 parts of ligroin (B. P. 80–100° C.), cooling and filtering. When dry it is sulphonated by stirring in 10 parts of 10% oleum at 35° C. for half an hour.

The dyestuff is similar in properties to the dyestuff of Example 2 but slightly yellower and brighter in shade. It is 3-sulpho-p-butylphenyl-6-sulpho-p-butylanilino-1:9-anthrapyridone.

*Example 4*

150 parts of 1:4-di-p-toluidino-anthraquinone, 750 parts of glacial acetic acid, 150 parts of acetic anhydride and 1.2 parts of 100% sulphuric acid are stirred at 98–100° C. for 20 minutes. The deep-red solution is cooled and the acetyl compound isolated by pouring the solution into 8000 parts of water, filtering, washing with water and dilute ammonia and drying at ordinary temperature.

150 parts of the acetyl derivative, 1500 parts of β-ethoxyethyl alcohol and 17.5 parts of 32% aqueous caustic soda are stirred at 100° C. for 1 hour. After diluting with ethyl alcohol the pyridone derivative is filtered off, washed with ethyl alcohol and with water and dried. The dry product is boiled with 1000 parts of benzene, cooled and filtered.

Sulphonation is effected at 15–20° C. by dissolving 1 part of the pyridone derivative in 10 parts of 100% sulphuric acid, adding 2 parts of 20% oleum and stirring for 15 minutes. The mixture is poured into 36 parts of ice-water, filtered, the filtrate neutralised with sodium carbonate and the dyestuff precipitated with sodium chloride. The dyestuff is bluish-red in colour and dissolves with a bluish-red colour in concentrated sulphuric acid. It dyes wool from a faintly acid bath in bright bluish-red shades of good fastness properties.

A more soluble dyestuff, probably a disulphonic acid, may be obtained by using 4 parts of 20% oleum and stirring at 30–35° C. for 15 minutes.

1:4-di-p-toluidino-6-hydroxyanthraquinone may be used instead of 1:4-di-p-toluidino-anthraquinone in the first process above and a similar dyestuff obtained.

*Example 5*

1:4-di-p-anisidino-anthraquinone is monoacetylated by the method used in Example 1. 75 parts of the acetyl derivative are stirred with 750 parts of β-ethoxyethyl alcohol and 95 parts of 32% aqueous sodium hydroxide solution. The mixture is cooled, diluted with ethyl alcohol and the pyridone derivative filtered off, washed with alcohol and with water and dried. The dry product is boiled with 500 parts of benzene, the mixture is cooled and the purified pyridone derivative filtered off. It melts at 237–8° C.

1 part of the product is dissolved in 10 parts of sulphuric acid and 2 parts of 20% oleum are added at 25–30° C. and the mixture stirred for 15 minutes, and the dyestuff isolated as in Example 1.

The dyestuff, which is a monosulphonic acid, dyes wool in fast bright reddish-violet shades. Similar dyestuffs can be made from 1:4-di-p-butoxyanilinoanthraquinone and 1:4-di-p-phenoxyanilino-anthraquinone.

*Example 6*

This is similar to Example 5 but the starting material is 1:4-di-m-chloro-anilinoanthraquinone and the dyestuff yields bluish-red shades.

*Example 7*

50 parts of 1:4-di-mesidinoanthraquinone, 250 parts of nitrobenzene, 25 parts of acetic anhydride and 1.2 parts of 100% sulphuric acid are stirred together at 100° C. for 30 minutes. The bluish-red solution is then steam distilled to remove nitrobenzene and the product filtered, washed and dried.

50 parts of the above product, 300 parts of β-ethoxyethyl alcohol and 65 parts of 32% aqueous caustic soda are stirred together at 110–120° C. for 15 minutes. The mixture is poured into water and after heating the product is filtered off, washed with water and dried.

For purification the product is dissolved in 800 parts of glacial acetic acid and an impurity precipitated by gradual addition of water. After filtering from this impurity the purified product is precipitated in water, filtered, washed and dried.

The orange-red product is converted to a sulphonic acid by dissolving in 100% sulphuric acid and adding 20% oleum. The water-soluble dyestuff dyes wool in bright-red shades of good fastness especially to milling.

*Example 8*

1:4-di-p-phenylanilino-anthraquinone is monoacetylated by the method used in Example 1.

62 parts of the acetyl derivative, 500 parts of β-ethoxyethyl alcohol and 65 parts of 32% aqueous caustic soda are stirred together at 100° C. for 30 minutes. The product is filtered, washed with ethyl alcohol and with water, dried, impurities extracted by boiling with benzene and filtering, again dried. It is then sulphonated. The dyestuff yields fast reddish-violet shades.

*Example 9*

20 parts of 1:4-di-β-naphthylamino-anthraquinone, 100 parts of dry nitrobenzene, 10 parts of acetic anhydride and 0.4 part of 100% sulphuric acid are stirred at 120° C. for 1 hour. After diluting the reaction mixture with water the nitrobenzene is removed by steam-distillation and the monoacetyl-1:4-di-β-naphthylaminoanthraquinone filtered cold, washed with water containing ammonia and dried at 50° C.

For pyridonation, 20 parts of the above acetyl derivative, 200 parts of β-ethoxyethyl alcohol and 25 parts of 32% aqueous caustic soda are stirred at 100° C. for 1 hour. After cooling to 20° C. the pyridone derivative is filtered off, washed with ethyl alcohol and with water and dried.

It is sulphonated by dissolving in 100% sulphuric acid and adding 20% oleum. The dyestuff dyes in very bluish shades of red. A similar dyestuff may be made from 1:4-di-(5':6':7':8'-tetrahydro-β-naphthylamino) anthraquinone.

I claim:

1. Process for the production of 6-arylamino-3-arylanthrapyridonesulphonic acids, as hereinbefore defined, which comprises monoacetylating the corresponding 1:4-di-arylamino-anthraquinone, ring-closing the acetylated derivative to a 6-arylamino-3-arylanthrapyridone and sulphonating.

2. Process as claimed in claim 1, according to which 1:4-di-p-butylanilino-anthraquinone is monoacetylated, ring-closed to the pyridone derivative and sulphonated to the corresponding disulphonic acid.

3. 6 - sulpho-p-butylanilino-3-sulpho-p-butylphenylanthrapyridone.

4. Arylamino-3-arylanthrapyridone sulphonic acids.

5. Arylamino-3-arylanthrapyridone sulphonic acids which carry in at least one of the aryl groups a radical of the group consisting of alkyl, alkoxy, aryl, aryloxy, halogen and hydroxy in which the aryl groups in all cases are of the benzene series.

6. The process for preparing 6-phenylamino-3-phenyl-anthrapyridone sulfonic acids which carry in each of the two phenyl rings like alkyl substituents, which comprises monoacetylating the corresponding 1,4-diphenyl-aminoanthraquinone, effecting ring closure of the monoacetyl derivative to the corresponding 6-phenylamino-3-phenylanthrapyridone and sulfonating the resulting product.

7. 6-phenylamino-3-phenylanthrapyridone sulfonic acids which carry in each of the two phenyl rings like alkyl substituents.

FRANK LODGE.

CERTIFICATE OF CORRECTION.

Patent 2,300,453.  November 3, 1942.

FRANK LODGE.

It is hereby certified that error appears in the printed specification of the above numbered patent requiring correction as follows: Page 1, second column, line 53-54, for "anthroquinone" read --anthraquinone--; page 3, second column, lines 8 and 10, claims 4 and 5, for "Arylamino" read --6-arylamino--; and that the said Letters Patent should be read with this correction therein that the same may conform to the record of the case in the Patent Office.

Signed and sealed this 5th day of January, A. D. 1943.

(Seal)

Henry Van Arsdale,
Acting Commissioner of Patents.